(12) United States Patent
Young et al.

(10) Patent No.: US 7,450,718 B2
(45) Date of Patent: Nov. 11, 2008

(54) ONE-WAY SYNCHRONIZATION OF A TWO-WAY QKD SYSTEM

(75) Inventors: Jonathan Young, Newburyport, MA (US); Michael J. Lagasse, Nahant, MA (US)

(73) Assignee: MagiQ Technologies, Inc, New York, NY (US)

( * ) Notice: Subject to any disclaimer, the term of this patent is extended or adjusted under 35 U.S.C. 154(b) by 869 days.

(21) Appl. No.: 11/071,696

(22) Filed: Mar. 3, 2005

(65) Prior Publication Data

US 2006/0198521 A1    Sep. 7, 2006

(51) Int. Cl.
*G06F 9/00* (2006.01)

(52) U.S. Cl. .................................. 380/225; 380/270
(58) Field of Classification Search .................. 380/225, 380/270
See application file for complete search history.

(56) References Cited

U.S. PATENT DOCUMENTS

| 5,675,648 A | 10/1997 | Townsend |
| 2003/0231771 A1 | 12/2003 | Gisin et al. |

OTHER PUBLICATIONS

Ribordy et al., "Automatic 'plug and play' quantum key distribution," Elec. Lett. Oct. 29, 1998, vol. 34, No. 22, pp. 2116-2117.
Stucki et al., "Quantum key distribution over 67 km with a plug & play system," New J. Phys. 4 (2002), 41.1-41.8 (IOP pub. ltd).
Kolluri et al., "A 100Mb/s clock recovery and data retiming chip set," presented at Broadband (FOC/LAN) Oct. 30-Nov. 3, 1989, pp. 87-90.

*Primary Examiner*—Thomas R Peeso
(74) *Attorney, Agent, or Firm*—Opticus IP Law PLLC

(57) ABSTRACT

A method of synchronizing the operation of a two-way QKD system by sending a sync signal (SC) in only one direction, namely from one QKD station (ALICE) to the other QKD station (BOB). The one-way transmission greatly reduces the amount of light scattering as compared to two-way sync signal transmission. The method includes phase-locking the sync signal at BOB and dithering the timing of the quantum signals so as to operate the QKD system in three different operating states. The number of detected quantum signals is counted for each state for a given number of detector gating signals. The QKD system is then operated in the state associated with the greatest number of detected quantum signals. This method is rapidly repeated during the operation of the QKD system to compensate for timing errors to maintain the system at or near its optimum operating state. The method allows for only having to adjust the timing of a single timed element—namely, the quantum laser—to compensate for timing variations, rather than having to adjust the timing of all or some of the timed elements in the QKD system.

11 Claims, 3 Drawing Sheets

ONE-WAY SYNCHRONIZATION OF A TWO-WAY QKD SYSTEM

CROSS-REFERENCE TO RELATED APPLICATIONS

The present patent application is related to PCT patent application no. PCT/US2004/03299, entitled "QKD systems with robust timing," published on Aug. 26, 2004 as WO 2004/073234 A2, and to PCT patent application no. PCT/US2004/02429, entitled "Detector autocalibration in QKD systems," which patent applications are incorporated by reference herein.

FIELD OF THE INVENTION

The present invention relates to quantum cryptography, and in particular relates to synchronizing the operation of the two quantum key distribution (QKD) stations in a two-way QKD system.

BACKGROUND OF THE INVENTION

Quantum key distribution involves establishing a key between a sender ("ALICE") and a receiver ("BOB") by using weak (e.g., 0.1 photon on average) optical signals ("quantum signals") transmitted over a "quantum channel." The security of the key distribution is based on the quantum mechanical principle that any measurement of a quantum system in unknown state will modify its state. As a consequence, an eavesdropper ("Eve") that attempts to intercept or otherwise measure the quantum signal will introduce errors into the transmitted signals, thereby revealing her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984)(hereinafter, "Bennett & Brassard"). Specific QKD systems are described in publications by C. H. Bennett et al entitled "Experimental Quantum Cryptography," J. Cryptology 5: 3-28 (1992), and by C. H. Bennett entitled "Quantum Cryptography Using Any Two Non-Orthogonal States", Phys. Rev. Lett. 68 3121 (1992), and in U.S. Pat. No. 5,307,410 to Bennett (the '410 patent). The general process for performing QKD is described in the book by Bouwmeester et al., "The Physics of Quantum Information," Springer-Verlag 2001, in Section 2.3, pages 27-33.

U.S. Pat. No. 6,438,234 to Gisin (the '234 patent), which patent is incorporated herein by reference, discloses a so-called "two-way" QKD system, wherein the quantum signals are autocompensated for polarization and thermal variations. In a typical two-way QKD system, a synchronization channel is also run in both directions to coordinate the timing at both QKD stations.

Even the quantum signals are compensated in a two-way system, synchronization ("sync") signals that travel only one way through an optical system would not be autocompensated for variations in the optical path connecting ALICE and BOB.

Variations in the timing circuits also affect the timing relationship between the arriving quantum signal (which has one photon or less, on average) and the single-photon detector (SPD) detection window. Accordingly, both thermal and electronic timing variations can act to reduce the probability of successfully detecting the quantum signal. While some degree of variation could be compensated by using a wider detection window, this results in an increase in the false positive detections (counts) in the SPD, which reduces system performance.

Other options are available for synchronizing the operation of a two-way QKD system. One option involves sending synchronization signals back and forth between the two QKD stations in the system. However, this is not desirable in the case where the optical fiber link connecting the two QKD stations carries both the quantum signal and the synchronization signal. This is because scattered light from the stronger synchronization signals can interfere with the SPD detection process, particularly when the quantum and synchronization channels operate at the same wavelength.

SUMMARY OF THE INVENTION

An aspect of the invention is a method of synchronizing the transmission of quantum signals between first and second QKD stations (ALICE and BOB) in a two-way QKD system by sending the synchronization ("sync") signals in only one direction between the two stations. The method includes sending the sync signal from ALICE to BOB and phase locking the sync signal at BOB. The method further includes rapidly switching the operation of the QKD system between three different operating states each having a different timing for the quantum signal. For each operating state, the number of detected quantum signals over a given time period is counted. The QKD system is then placed in the operating state having the greatest number of detected quantum signals. This allows for variations in the timing of the QKD system to be compensated for by adjusting just the laser timing rather than the timing of all of the timed elements in the QKD system.

The method optionally includes adding "blank" sync pulses that overlap the quantum signals returning to BOB from ALICE. This reduces the chance of obtaining a false detection due to scattering from a sync pulse that overlaps the quantum pulse.

Figure 1:
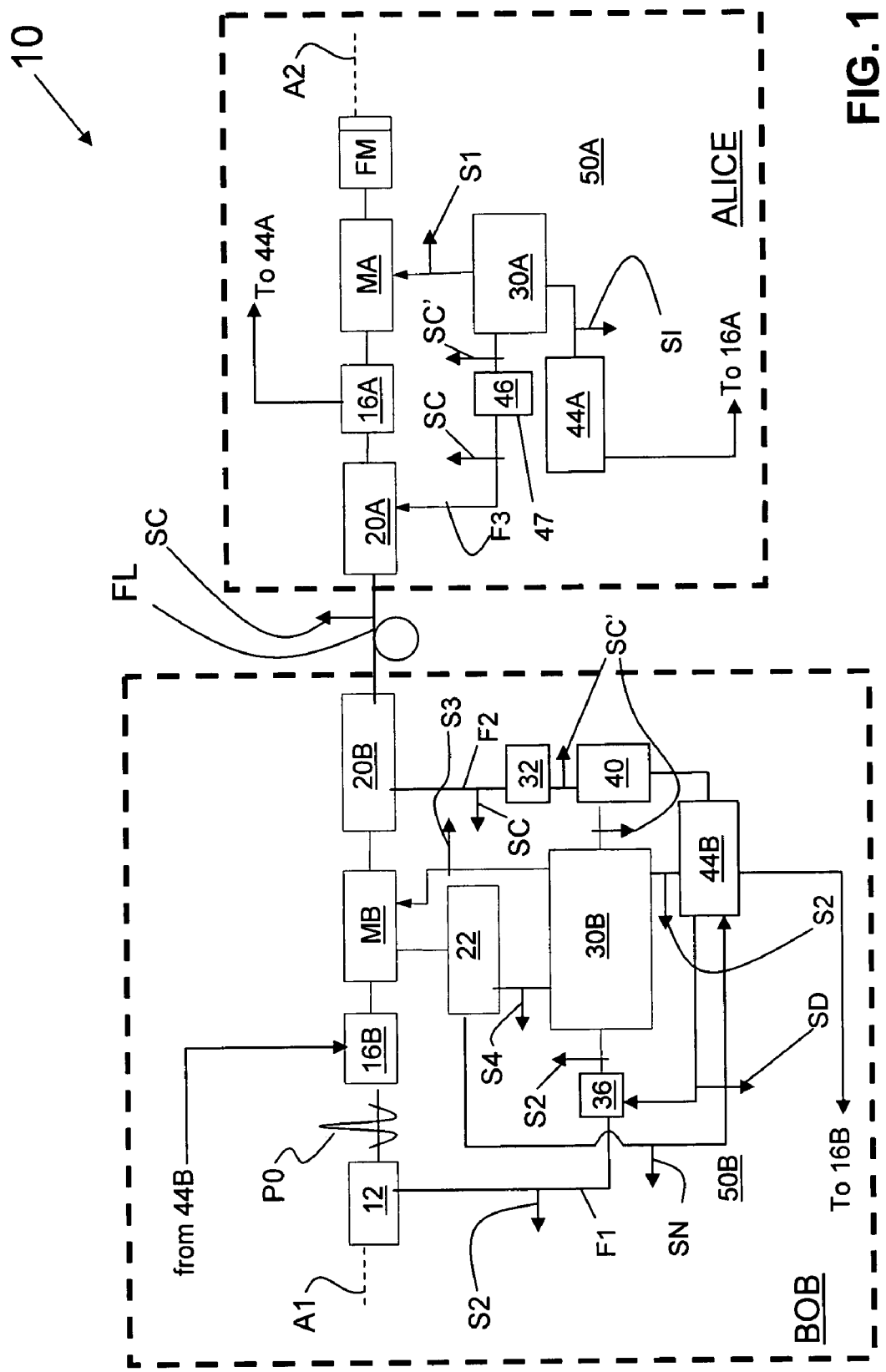
FIG. 1 is a schematic diagram of a two-way QKD system having conventional fiber-optics-based QKD stations BOB and ALICE.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

DETAILED DESCRIPTION OF THE INVENTION

FIG. 1 is a schematic diagram of a two-way QKD system 10 having two QKD stations BOB and ALICE optically coupled to one another by an optical fiber link FL of length L. The construction of the two QKD stations BOB and ALICE is described below, followed by the method of operation that allows for one-way synchronization of the two QKD stations.

BOB

With continuing reference to FIG. 1, BOB includes, in order along an optical axis A1, a quantum laser 12, a variable optical attenuator (VOA) 16B, a phase modulator unit MB, and an optical modem 20B. The term "quantum laser" is used herein to emphasize the fact that quantum laser 12 generates optical pulses P0 that serve as the quantum signals (pulses) for system 10.

Phase modulator unit MB includes a random number generator (RNG), a phase modulator and a phase modulator driver, which are not individually shown for ease of illustration. Phase modulator unit MB is adapted to impart a phase to a quantum signal passing therethrough, wherein the phase is randomly selected from a set of possible phase modulations in response to a timed modulation control signal S3 (discussed below).

BOB also includes an SPD unit 22 in optical communication with phase modulator unit MB. In an example embodiment, SPD unit 22 includes two SPDs (not shown). Phase modulator unit MB is adapted to direct quantum signals to the SPD unit that travel from ALICE back to BOB, and that are modulated by the modulating unit. In a typical two-way QKD system, this is accomplished with an interferometer loop (not shown) with a phase modulator in one arm of the loop. SPD unit 22 is operably coupled to a slave timing unit 30B that controls the SPD gating, as described below. Slave timing unit 30B is also operably coupled to phase modulator unit MB.

Bob also includes a dither control unit 36 that is operably couple to quantum laser 12 via an optical fiber section F1. Dither control unit 36 is also electrically coupled to slave timing unit 30B.

Bob further includes a phase-lock loop circuit (PLL) 40 electrically coupled to slave timing unit 30B and also to a photodetector 32. Photodetector 32 is optically coupled to optical modem 20B via an optical fiber link F2. Bob also includes a microcontroller 44B, such as a field-programmable gate array (FPGA) or a microprocessor. VOA 16B, SPD unit 22, slave timing unit 30B, dither control unit 36, and PLL 40 are electrically coupled to microcontroller 44B, which is adapted to control the operation of these elements.

ALICE

Alice includes, in order along an optical axis A2 in the direction away from BOB, an optical modem 20A, a VOA 16A, a phase modulator unit MA, and a Faraday mirror FM. Phase modulator unit MA is identical to or substantially the same as phase modulator unit MB, and thus also includes an RNG, a phase modulator and a phase modulator driver (not shown) that operate in the same fashion as described in connection with phase modulator unit MB. Phase modulator unit MA is electrically coupled to a master timing unit 30A. Master timing unit 30A is also electrically coupled to a sync laser 46 that has an output end 47 that emits laser radiation in the form of optical synchronization ("sync") signals SC. Laser output end 47 is optically coupled to optical modem 20A via an optical fiber section F3. ALICE also includes a microcontroller 44A, such as an FPGA or microprocessor. Master timing unit 30A and VOA 16A are electrically coupled to microcontroller 44A, which is adapted to control the operation of these elements.

Synchronization of the QKD System

The synchronization of QKD system 10 is controlled by master timing unit 30A at ALICE. In response to an initiation signal SI from microcontroller 44A, master timing unit 30A generates an electrical synchronization ("sync") signal SC' that travels to sync laser 46. Sync laser 46 converts electrical sync signal SC' to an optical sync signal SC. Optical sync signal SC then travels to optical modem 20A via optical fiber section F3. Optical modem 20A directs optical sync signal SC to travel over optical fiber link FL to optical modem 20B at BOB. Optical modem 20B then directs optical sync signal SC to photodetector 32, which converts the optical sync signal back to electrical sync signal SC'.

The electrical sync signal SC' is then received by PLL 40, which sends the signal onto slave timing unit 30B. PLL 40 acts to phase-lock the master timing unit 30A to slave timing unit 30B. Master timing unit 30A also generates a modulator control signal S1 that controls the activation of phase modulator unit MA at ALICE so as to randomly modulate quantum signals P0 based on a select group of possible phase modulations when the quantum signal passes through the modulator unit on its way back to BOB.

Sync signals SC and SC' (hereinafter referred to collectively as "sync signal SC" for simplicity) thus synchronize slave timing unit 30B to master timing unit 30A. PLL 40 serves to maintain the timing between the master and slave timing units by phase-locking the two units.

A laser control signal S2 is generated by slave timing unit 30B and passes to dither control unit 36. Laser control signal S2 is then passed by dither control unit 36 with a time delay or no time delay, as discussed in detail below. Laser control signal S2 then proceeds to quantum laser 12 to activate the laser to generate an output optical pulse (i.e., quantum signal) P0.

Slave timing unit 30B also generates a modulation control signal S3 timed to activate phase modulator unit MB to phase modulate the quantum signal with a phase modulation randomly selected from a group of possible phase modulations upon its return from ALICE.

Slave timing unit 30B also generates an SPD gating signal S4 timed to expected arrival of the twice-modulated quantum signal P0 that arrives at SPD unit 22 from phase modulator unit 30B.

In an example embodiment, microcontroller 44B monitors and stores timing information for laser control signals S2 sent by slave timing unit 30B to dither control unit 36.

Sync Timing Compensation

Having sync signal SC travel only in one direction from ALICE to BOB reduces the amount of scattering in the optical fiber link FL as compared to QKD systems in which the sync signal and the quantum signals both travel over the same optical fiber link in both directions. However, since sync signal SC travels one-way through the system, changes in the length of optical fiber link FL cause changes in the arrival time of a quantum signal at SPD UNIT 22. The sync signals SC are not autocompensated in the manner of the quantum signals P0 because the sync signals only travel in one direction in the system, namely from ALICE to BOB. Accordingly, the synchronization of QKD system 10 needs to be adjusted to account for the changes in the optical path length between ALICE and BOB, such as changes in the optical fiber link FL due to environmental affects, e.g., changes in temperature.

Several example one-way synchronization methods based on the above-described QKD system are described below. The methods allow for maintaining the synchronization of QKD system 10 even if there is a change in the optical fiber link FL connecting ALICE and BOB One-Way Sync with Laser Dither With continuing reference to FIG. 1, if the length L of optical fiber link FL changes by an amount length ΔL, then the round-trip time for the quantum signal P0 to travel from BOB to ALICE and back to BOB changes by a factor of $\Delta t_0 = (2)(n)(\Delta L)/(c)$, where c is the speed of light, and n is the index of refraction of the optical fiber link FL.

Because sync signal SC travels only one way over the optical fiber, its arrival at BOB changed by a factor of $\Delta t_{SC} = (n)(\Delta L)/(c) = \Delta t_0/2$. However, this delay is sensed by PLL 40, so that master timing unit 30A and slave timing unit 30B continue to operate in synchrony with a time change of $\Delta t_0/2$ as compared to its previous operating state when $\Delta L=0$. This results in an overall timing error of $\Delta t_0/2$ with respect to those elements in BOB having timed operation, i.e., quantum laser 12, phase modulator unit MB and SPD unit 22. This timing error degrades the performance of QKD system 10 as manifested by a decrease in the number of quantum signals detected by SPD unit 22 in a given time frame (e.g., a given number of SPD gating signals S4).

To compensate for synchronization errors on an ongoing basis during the operation of QKD system 10, in an example embodiment the synchronization of the system is monitored and adjusted as follows. First, the system is operated in a first operating state for a given number ND of detector gating signals—say 30,000—and the number N1 of quantum signals ("photons") detected by SPD unit 22 for the ND detector gating signals is recorded in microcontroller 44B. For a gating signal period of 1.5 microseconds, this process takes about 0.05 second. For a mean photon number $\mu \sim 0.1$ for quantum signals P0, and a detector efficiency of about 10%, the number of photon counts N1 would be about 300. In a real-world QKD system, further losses might lead to a photon count N1 of about 30.

Next, QKD system is placed in a second operating state. In the second state, dither control unit 36 generates a time delay in laser control signal S2 of $-\Delta t$. That is to say, the timing of the laser control signal S2 is adjusted by a small amount (e.g., 20 picoseconds) by dither control unit 36 so that quantum laser 12 generates quantum signal P0 slightly earlier than it did when operating in the first state. System 10 is allowed to operate for another set of ND=30,000 detector gate signals, and the number N2 of photons detected during this time is recorded in microcontroller 44B.

Next, QKD system 10 is placed in a third operating state. In the third state, dither control unit 36 generates a time delay in laser control signal S2 of $+\Delta t$. That is to say, the timing of the laser control signal is adjusted by dither control unit 36 so that quantum laser 12 generates quantum signal P0 slightly later than it did when operating in the first state. System 10 is allowed to operate for another set of ND=30,000 detector gate signals, and the number N3 of photons detected during this time is recorded in microcontroller 44B.

Cycling QKD system 10 through the three operating states in the manner described above takes about a total of about $(3)(0.05 \text{ s})=0.15$ second, and does not interfere with the normal operation of the QKD system. Note also that the process is very rapid and so can account for changes in the timing over a relatively fast time frame as compared to most environmentally induced changes.

The detector counts N1, N2 and N3 for the respective first, second and third states are then compared in microprocessor 44B to determine which count is the largest. Microcontroller 44B then sends a dither control signal SD to dither control unit 36 that identifies which amount of time delay ($-\Delta t$, $+\Delta t$ or 0 (no delay)) corresponds to the largest photon count. Dither control unit 36 then provides the identified time delay to laser control signal S2 in order to place system 10 in the state having the largest photon count number.

This new operating state then becomes the first operating state. The process of placing the system in three different operating (timing) states by dithering the timing of laser control signal S2 and then selecting the operation state with the largest photon count is carried out repeatedly during the operation of the system to maintain optimum or near-optimum synchronization between BOB and ALICE.

The time delays determined by microcontroller 44B and provided to quantum laser 12 by the above-described method serve to compensate for changes in the timing of sync signal SC that occur from changes in the optical path length between ALICE and BOB. Accordingly, if optical fiber link FL changes length due to environmental effects such as changes in temperature, the above-described dithering and re-setting of the laser control signal timing compensates for the corresponding change in the sync signal timing so that the system can continue to operate in an optimum or near-optimum state.

One-Way Sync with Blanking

The above-described synchronization method can be performed by sending sync signals SC over optical fiber link FL at the same time quantum channel pulses P0 are present in the optical fiber link. Simultaneous sending of one-way sync signals SC and quantum channel pulses P0 results in a ⅓ (5 dB) reduction in optical scattering as compared to sending sync pulses in both directions between BOB and ALICE.

Figure 2:
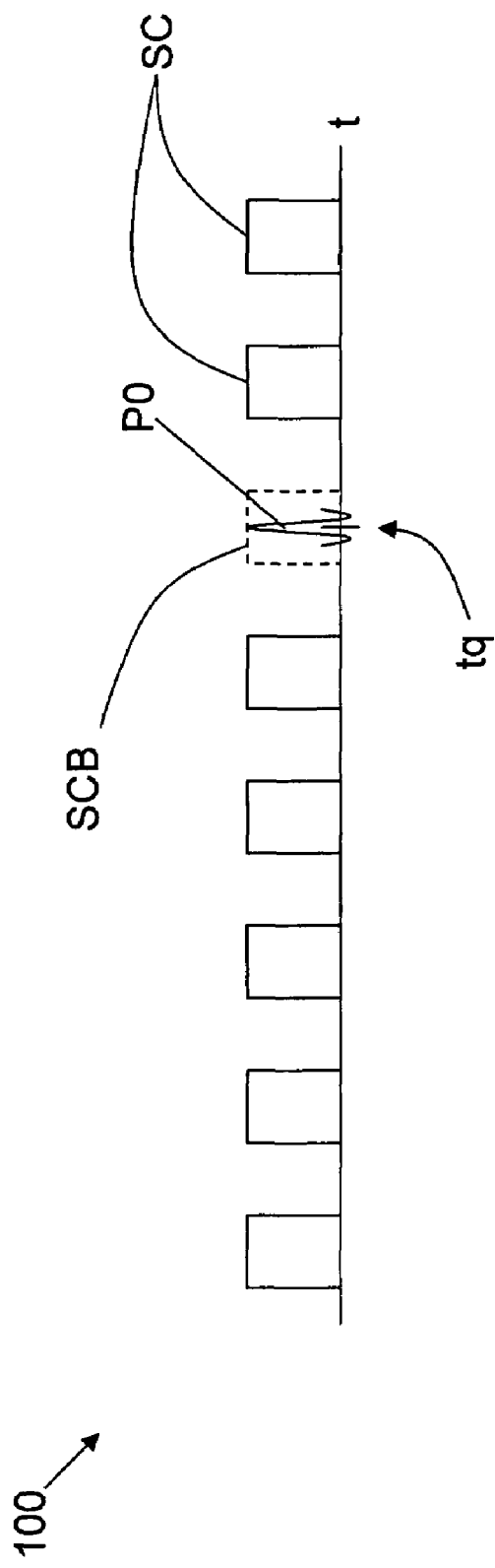
FIG. 2 is a timing diagram that illustrates a train of sync signals SC with selectively blanked pulses SCB timed to correspond to the presence of a quantum signal P0 traveling from ALICE to BOB.

To further reduce the adverse effects of scattering of the sync signal, in an example embodiment, one or more blank pulses ("blanks") are added to the train of sync signals (pulses) SC. The one or more blanks are added at or around a time tq associated with the presence of a quantum signal P0. FIG. 2 is a timing diagram that illustrates a train 100 of sync signals SC with a blank pulse SCB selectively placed (timed) at time tq so as to overlap quantum signal P0 traveling from ALICE to BOB. Without adding at least one blank, quantum signal P0 would be overlapped with a sync signal SC while the quantum signal travels from ALICE to BOB. Adding a blank sync pulse significantly reduces the amount of scattered light that could otherwise arrive at SPD unit 22 along with the quantum signal during the SPD gating interval. The reduction in scattering using this approach is about 10 dB as compared to not using sync signal blanking.

Sync signal blanking is particularly useful when the sync signal rate is higher than that of the quantum channel signal (pulse) rate. In an example embodiment, the sync signal rate is about 78 MHz and the quantum channel rate is about 0.6 MHz, so that there are 128 sync pulses S1 for every quantum channel signal P0. The abundance of sync pulses allows for one or a few out of every 128 pulses to be blanked to accommodate the presence of a quantum signal P0.

Return-to Zero (R-Z) Sync Signal Format Via External Modulation

Figure 3:
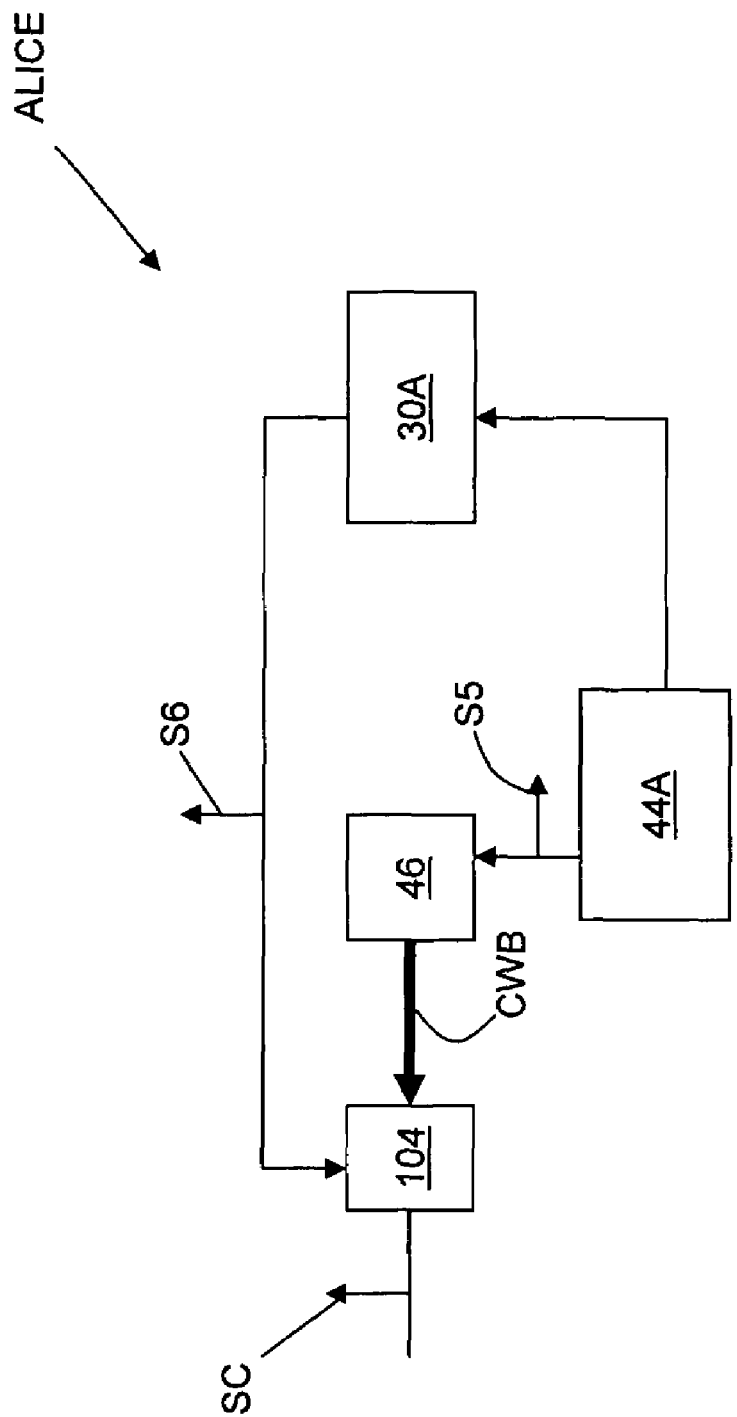
FIG. 3 close-up schematic diagram of an alternate embodiment of ALICE of FIG. 1, wherein the sync laser is externally modulated to create the sync signals.

In practice, sync laser 46 is typically directly modulated by master timing unit 30B to form the train of sync signals SC rather than being turned on and off. For present-day sync lasers, which are typically laser diodes, rapidly turning on and off the laser causes ringing and other adverse affects in the laser output. Accordingly, in an example embodiment, the pulses in sync signals SC (including the blanked sync pulses SCB) formed via external modulation rather than by direct modulation (i.e., turning the sync laser on and off) results in a small residual light in the blanked signal that can contribute a correspondingly small amount of light scatter. This is illustrated in FIG. 3, which is a close-up schematic diagram of an alternate embodiment of ALICE, wherein sync laser 46 is externally modulated by a modulator 104 upstream of the sync laser. Modulator 104 is operably coupled to master timing unit 30A, which drives the modulation of modulator 102. In the embodiment of FIG. 3, sync laser 46 is coupled to micro-controller 44A, which causes the sync laser to emit a continuous wave beam CWB via a drive signal S5. Beam CWB passes to modulator 104, which modulates the beam according to a modulator signal S6 from master timing unit 30A to create optical sync signal SC with an R-Z format.

Reduced Sync-Signal Rate

Another approach to reduce the adverse effects of light scattering by the sync signal is to reduce the sync signal rate to the minimum required to maintain synchronization. As mentioned above, in an example embodiment, the sync signal rate is much higher than that of the quantum signal, e.g., about 78 MHz for the sync signal as compared to about 1 MHz for the quantum signal.

Thus, in another example embodiment, the sync signal rate is reduced to the limit of the PLL's ability to keep master timing unit 30A and slave timing unit 30B locked to one another. For the typical PLL, a sync signal rate of about 78 MHz is needed for the PLL to perform its phase-locking function. Reducing the rate of sync signal SC to the PLL lower limit reduces the amount of scattering by a factor of 100. In an example embodiment, this approach is combined with sync signal blanking to reduce scattering even further.

The one-way synchronization systems and methods described above have the advantage that only the timing of one active element in the system—namely, quantum laser 12 at BOB—needs to be adjusted to maintain synchronization. This approach is far simpler than methods that require the adjustment of more or all of the multiple active elements in the QKD system.

In the foregoing Detailed Description, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction, operation and example embodiments described herein. Accordingly, other embodiments are within the scope of the appended claims.

What is claimed is:

1. A method of synchronizing the operation of a two-way QKD system having a first QKD station (BOB) with a quantum laser for generating quantum signals and a single-photon detector (SPD) unit gated by detector gating signals, wherein BOB is optically coupled to a second reflecting QKD station (ALICE) via an optical fiber link that carries the quantum signals, the method comprising:
   sending a synchronization (sync) signal in one direction from ALICE to BOB over the optical fiber link;
   phase locking the sync signal at BOB;
   wherein the quantum laser is responsive to a timed laser control signal and including dithering the timing of the laser control signal so as to operate the QKD system in three different operating states each having a different laser control signal timing;
   for each operating state, counting the number of detected quantum signals at the SPD unit for a given number of detector gating signals; and
   placing the QKD system in the operating state having the greatest number of detected quantum signals.

2. The method of claim 1, including:
   generating the sync signal with a master timing unit at ALICE;
   receiving the sync signal at a slave timing unit at BOB;
   generating the dithered laser control signal via a dither control unit electronically coupled to the slave timing unit and to the quantum laser; and
   phase locking the master timing unit and slave timing unit with a phase-lock loop (PLL).

3. The method of claim 2, including:
   comparing the number of photon counts for each operating state in a microcontroller; and
   providing a dither control signal from the microcontroller to the dither control unit to adjust the timing of the laser control signal to place the QKD system in the operation state having the greatest number of detected quantum signals.

4. The method of claim 1, wherein:
   providing a blank sync signal at a time that overlaps a transmission time of a quantum signal that travels from ALICE to BOB over the optical fiber link.

5. The method of claim 2, wherein the sync signal has a rate that is at or near a minimum rate at which the PLL can maintain phase locking between the master timing unit and the slave timing unit.

6. The method of claim 2, including generating the sync signals by passing a continuous-wave laser beam through modulator driven by the master timing unit.

7. The method of claim 1, wherein the sync signals are in return-to-zero format.

8. A method of synchronizing the transmission of quantum signals between first and second QKD stations (ALICE and BOB) in a two-way QKD system, comprising:
   sending a synchronization (sync) from ALICE to BOB;
   phase locking the sync signal at BOB;
   operating the QKD system in three different operating states each having a different timing for the quantum signal;
   for each operating state, counting a number of detected quantum signals over a given time period; and
   placing the QKD system in the operating state having the greatest number of detected quantum signals.

9. The method of claim 8, including providing a blank sync signal at a time that overlaps a transmission time of a quantum signal that travels from ALICE to BOB.

10. The method of claim 8, wherein the sync signal has a rate that is at or near a minimum rate at which the phase locking of the sync signal can be maintained.

11. A method of adjusting the timing between timed elements in a two-way QKD system having two QKD stations ALICE and BOB, wherein BOB includes a quantum laser that emits quantum signals in response to a timed control signal, comprising:
   sending a synchronization ("sync") signal from ALICE to BOB and phase locking the sync signal at BOB;
   operating the QKD system while varying the timing of the control signal;
   counting a number of detected quantum signals returned to BOB from ALICE for each varied timing; and
   setting the timing of the timed control signal to correspond to the greatest number of counts.

* * * * *